US006546392B1

(12) United States Patent
Bahlmann

(10) Patent No.: US 6,546,392 B1
(45) Date of Patent: Apr. 8, 2003

(54) SELF SERVICE GATEWAY

(75) Inventor: Bruce F. Bahlmann, White Bear Lake, MN (US)

(73) Assignee: MediaOne Group, Inc., Englewood, CO (US)

(*) Notice: Subject to any disclaimer, the term of this patent is extended or adjusted under 35 U.S.C. 154(b) by 0 days.

(21) Appl. No.: 09/344,715

(22) Filed: Jun. 25, 1999

(51) Int. Cl.[7] .............................................. G06F 17/30
(52) U.S. Cl. ............................................ 707/9; 707/10
(58) Field of Search ....................... 707/1, 9, 10, 104.1; 709/100, 310, 328, 220; 380/255

(56) References Cited

U.S. PATENT DOCUMENTS

| | | | | | |
|---|---|---|---|---|---|
| 5,848,412 | A | * | 12/1998 | Rowland et al. | 707/9 |
| 5,884,284 | A | * | 3/1999 | Peters et al. | 705/30 |
| 5,907,621 | A | * | 5/1999 | Bachman et al. | 380/25 |
| 6,023,464 | A | * | 2/2000 | Woundy | 370/352 |
| 6,047,268 | A | * | 4/2000 | Bartoli et al. | 705/35 |
| 6,104,796 | A | * | 8/2000 | Kasrai | 379/201 |
| 6,115,737 | A | * | 9/2000 | Ely et al. | 709/203 |
| 6,161,128 | A | * | 12/2000 | Smyk | 709/205 |
| 6,195,689 | B1 | * | 2/2001 | Bahlmann | 709/217 |
| 6,216,159 | B1 | * | 4/2001 | Chintakrindi et al. | 709/220 |
| 6,243,451 | B1 | * | 6/2001 | Shah et al. | 379/201 |
| 6,272,208 | B1 | * | 8/2001 | Kasrai | 379/15 |
| 6,282,281 | B1 | * | 8/2001 | Low | 379/230 |
| 6,308,273 | B1 | * | 10/2001 | Goertzel et al. | 713/201 |
| 6,337,899 | B1 | * | 1/2002 | Alcendor et al. | 379/88.17 |

* cited by examiner

*Primary Examiner*—Frantz Coby
*Assistant Examiner*—Uyen Le
(74) *Attorney, Agent, or Firm*—Brooks & Kushman, P.C.

(57) ABSTRACT

A self service gateway and method of operation that allows a user on a network to interface with the provisioning and billing systems of the network. The self service gateway is controlled by a user interface program that interfaces the user with the provisioning and billing systems. User identifications, passwords, and other user related data are stored in a record database. A tool database holds a set of tools used to instruct or enable the user interface program to invoke, present, and process information provided to and received from the users. Web pages are stored in another database. A web server program provides a standard set of protocols for communicating on the network. In operation, the user logs into the self service gateway and provides commands and inputs that may result in changes in the provisioning and billing systems and the record database.

41 Claims, 8 Drawing Sheets

SELF SERVICE GATEWAY

TECHNICAL FIELD

The present invention relates to the field of network-based user interfaces to a provisioning system and a billing system.

BACKGROUND ART

Customer accounts and much of the equipment interfaced to a network are currently controlled by a network service provider company. Each time a customer requires service to their account and equipment they must contact the company and speak to an employee. Every new customer wishing to open an account and subscribe to the company's services must also speak to the company's employees. Once the employees understand the customer's needs, they must manually carry out the requested changes, open new accounts, close existing accounts, dispatch a truck to the customer's locations, and so on. The cost to support these customer calls can run into the millions of dollars each year for large multiple subscriber organization companies.

From the customer's point of view, many would like greater direct control over their accounts and services for which they have subscribed. (These subscriptions may extend beyond network services to include video and telephone services.) A qualified customer that brings home a new personal computer in the evening would like to have the machine connected to the network that night. Dissatisfaction may result if the customer must wait until the next day when a company employee is available to register the new machine with the network's provisioning system. New customers would like to be able to hook up to the network and open a new account directly from their computer, as can be done with several larger national Internet service providers.

Presently, the provisioning system and billing system support tools used by the employees tend to be designed for very specific applications and were intended to be used by technically knowledgeable personnel. These tools lack the scaling, polish, cohesiveness and security necessary for use by the customers.

A customer oriented self service gateway can be used to shift some of the more basic tasks of maintaining existing customer accounts and adding new customers from the company employees to the customers. The basic idea is that once properly authenticated, a customer should be trusted and empowered to create and change various aspects of their accounts, sub-accounts, and settings in their local equipment. The self service gateway must be flexible and easily-expandable so that any additional functionality that the company wishes to allocate to the customers can be quickly deployed.

DISCLOSURE OF INVENTION

The present invention is a self service gateway and method of operation that allows a user on a network to interface with the provisioning system and the billing system of the network. The state of the self service gateway is controlled by at least one user interface program that interfaces to the users, the provisioning system, and the billing system. User identifications, passwords and other user related data is stored in a record database. A tool database holds a set of tools used to instruct or enable the user interface program to invoke, present, and process information to and from the users. HTML web page layouts are stored in another database. A web server program and web browsers provide a standard set of protocols for communicating on the network, including a secure socket layer that encrypts all communications. In operation, the user firsts login with the self service gateway. After a successful login, the user provides commands and inputs that may result in changes to the provisioning system and the billing system.

Division of the functionality between the user interface program, tool database, and web page layout database allows existing tools and web pages to be integrated into the self service gateway and to be executed as necessary. This makes it easier for the company to maintain and expand the self service gateway's capabilities while maintaining some uniformity in the look and feel of the self service gateway from the user's point of view.

Users may be either customers or employees of the network service provider. Employees access the provisioning system and billing system though an independent user interface program, and the employee records are maintained independent of the customer records. Users may reach the self service gateway from the private network of the company, or through public networks across the Internet.

In variation of the self service gateway, the user interface program may be in communications with a logging database to record all changes made by the users. A build tool program may be incorporated to develop and maintain the tools and HTML web pages. Communications may be provided to a customer service system to allow users to request field personnel support for tasks beyond the reach of the self service gateway. One or more network management protocol software programs may be included to support communications between the user interface program and user premise equipment accessible through the network.

Each tool is responsible for defining the validation of inputs associated with its particular function. Validation may range from checking parameters input from the user, and may extend to verifying that the requested changes have in fact been implemented. The tools may be responsive to the Internet Protocol address to restrict users from public networks. Tools may also be responsive to a user level assigned to each user, in order to provide various levels of access into the provisioning system, billing system and databases.

The set of tools includes, but is not limited to, a login authorization tool for controlling entry through the self service gateway. A medium access control address tool allows the user to register new equipment and de-register old equipment with the provisioning system. Password and alternate password change tools allow the user to choose new passwords. E-mail accounts and the associated e-mail parameters are controlled via an e-mail tool. Vanity names for the computer hostnames may be changed using a hostname tool. A service level tool allows the users to change the speed at which their equipment communicates on the network.

Accordingly, it is an object of the present invention to provide a system, and a method of operation for a system that allows users on a network to access the provisioning system and the billing system for the network.

Another object of the present invention is to provide the users with access to a customer service system.

Another object of the present invention is to provide the users with access to user premise equipment connected to the network.

Yet another object of the present invention is to log all changes initiated through the system.

These and other objects, features and advantages will be readily apparent upon consideration of the following detailed description in conjunction with the accompanying drawings.

BEST MODE FOR CARRYING OUT THE INVENTION

An Internet Architecture Board (IAB) defines the Internet standards used below in Standard protocols (STD) and Request For Comments (RFC) documents.

Figure 1:
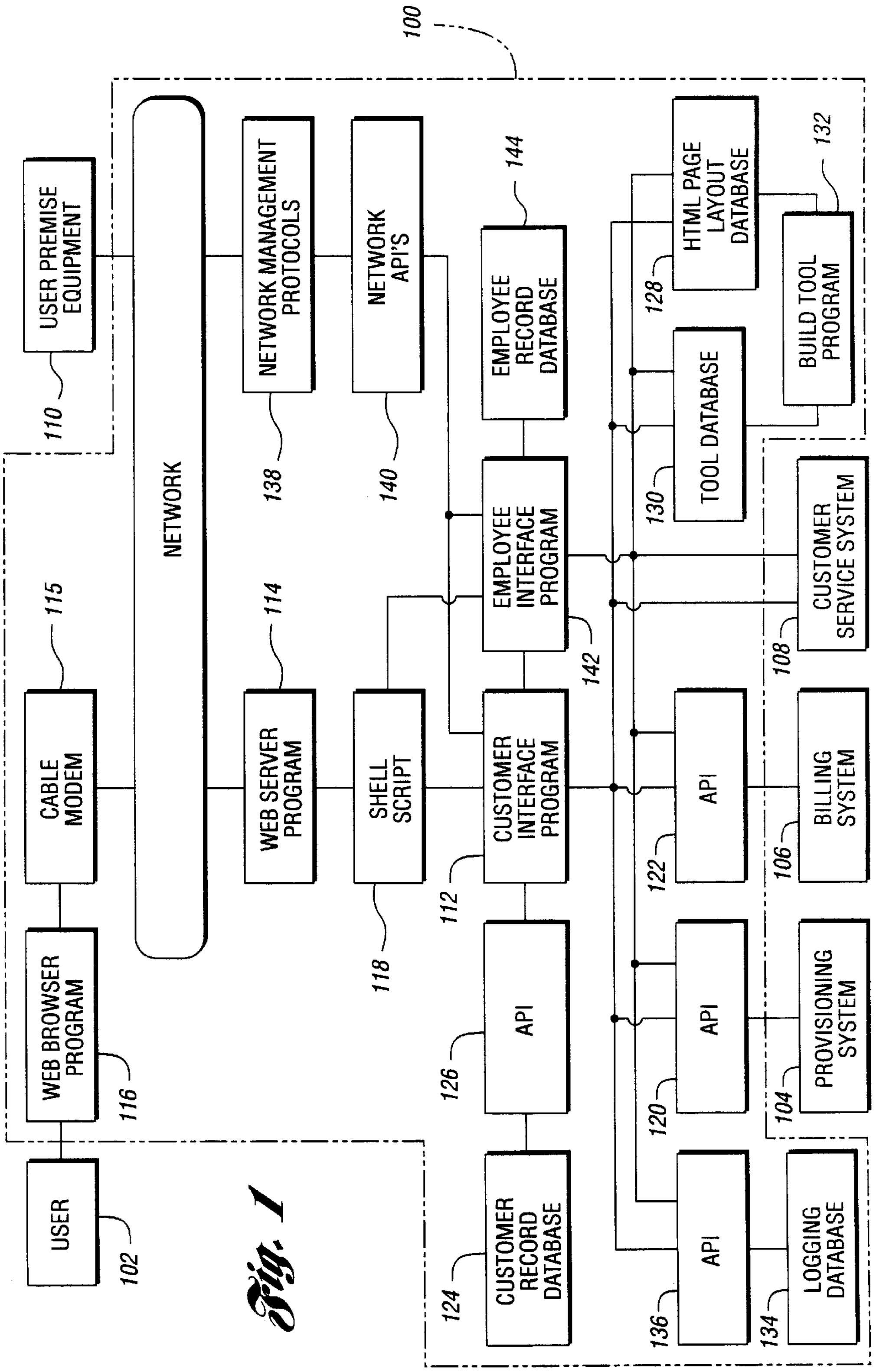
FIG. 1 is a block diagram of the software programs used in the present invention.

Referring to FIG. 1, the present invention is a self service gateway 100 that provides users 102 with access to services provided by a provisioning system 104, accounts in a billing system 106, and a customer service system 108 of a Multiple Subscriber Organization (MSO) company. The self service gateway 100 also provides the users 102 with access to user premise equipment 110 at the user's own location. The user premise equipment 110 may include equipment such as cable modems for computer network operations, set-top-boxes for video services, network interface units for telephony services, and any other device that can communicate with a computer.

At the core of the self service gateway 100 is a customer interface program 112. This program is one or more state machine software programs that step user 102, who are customers of the MSO company, through various on-line operations to view, add, delete, modify and replace parameters, accounts, filters, and similar information controlled by the provisioning system 104 and the billing system 106. Where on-line operations are not available, the customer interface program 112 provides customers with access to the MSO's customer service system 108 for additional assistance.

Customer interface program 112 communicates with the customers through a web server program 114, cable modem 115, and multiple web browser programs 116. Web server program 114 and web browser programs 116 provide a standard set of protocols to carry out the communications. In the preferred embodiment, the standard protocol set includes a Hypertext Markup Language (HTML)(IAB proposed standard protocol RFC 1866) and a Secure Socket Layer (SSL) protocol, developed by Netscape Communications Corporation of Mountain View, Calif. The HTML defines the graphical user interface (GUI) used to display information to the user 102 and receive information from the user 102. The Secure Socket Layer protocol defines encryption of all information exchanged between the web server program 114 and the web browser programs 116. The encryption is necessary to maintain security for user account information and any credit card data sent across the Internet. A shell script 118 is provided between the web browser program 114 and the customer interface program 112 allowing the customer interface program 112 to be written and operated independently of any particular vendor's web server program 114.

Customer interface program 112 communications with the provisioning system 104 and the billing system 106 take place through Application Interface Programs (API's) 120 and 122 respectively. Like the shell script program 118 between the customer interface program 112 and web server program 114, the API's 120 and 122 allow the customer interface program 112 to be written and operated independently of the particular vendor's equipment used in the provisioning system 104, and in the billing system 106.

Information is kept in a customer record database 124 for each registered customer and their user premise equipment 110. The information includes, a user identification, a password and an alternate password records used during the login process, as well as a user level record used to limit access to information and functionality. Medium access control address (MAC) records for the customer's computers (not shown) and other user premise equipment 110 is also kept in the customer record database 124 to help identify when the customers have upgraded their equipment, or at least replaced the network interface cards. An API 126 is provided between the customer interface program 112 and the customer record database 124 to accommodate differences between the interfaces.

A HTML page layout database 128 is provided to store the web pages presented to the users 102. For an MSO operating in several regions of the country, the HTML layout database 128 provides commonality in the look and feel of the user interface in all regions, and it allows for common changes to be handled rapidly in all regions. The web pages should support mapping or association of dynamic content with a particular area of a web page. Provisions are included in the page designs to support marketing opportunities for enterprise and regional content, such as cross selling. Dynamic content may be customized by region where necessary.

A tool database 130 provides a set of tools that instruct or enable the customer interface program 112 to invoke, display, and process information to and from the users 102. Separating the tool software code from the customer interface program 112 software code allows the software to be managed in reasonable sizes and it allows for the integration of existing standalone tools to be integrated into the self service gateway 100.

Build Tool Program 132 provides an environment to create and maintain existing tools in the tool database 130, and web pages in the HTML page layout database 128.

The customer interface program 112 also communicates with a logging database 134. The logging database 134 provides storage for modification events, login events, and errors identified by the various tools while executing. An application program interface 136 is provided between the customer interface program 112 and the logging database 134 to account for any differences in the interfaces.

One or more network management protocol software programs 138 are provided to facilitate customer interface program 112 communications with the user premise equipment 110. The network management protocols may include Simple Network Management Protocol (IAB RFC 1157), Telenet (IAB RFC 854), and similar protocols. Network API's 140 are provided to account for differences in the interfaces between the network management protocol software programs 138 and the customer interface program 112.

Employee interface program 142 is one or more state machine software programs that step user 102 who are employees of the MSO company through various on-line operations to access the provisioning system 104, the billing system 106, and the customer service system 108. Employee interface program 142 is a duplicate of the customer interface program 112 with one different interface. For security reasons, the user identifications, passwords and alternate passwords for the employees are maintained in an employee record database 144 independent of the customer record database 124. By virtue of having different user levels, employees using the employee interface program 142 see additional information, and have access to additional functions than customers using the customer interface program 112. For example, an employee may search the logging database 134 to determine the last date and time a customer was logged onto the self service gateway 100. The web pages displayed to an employee may also show additional hyperlinks and additional help information not suitable for customers.

Figure 2:
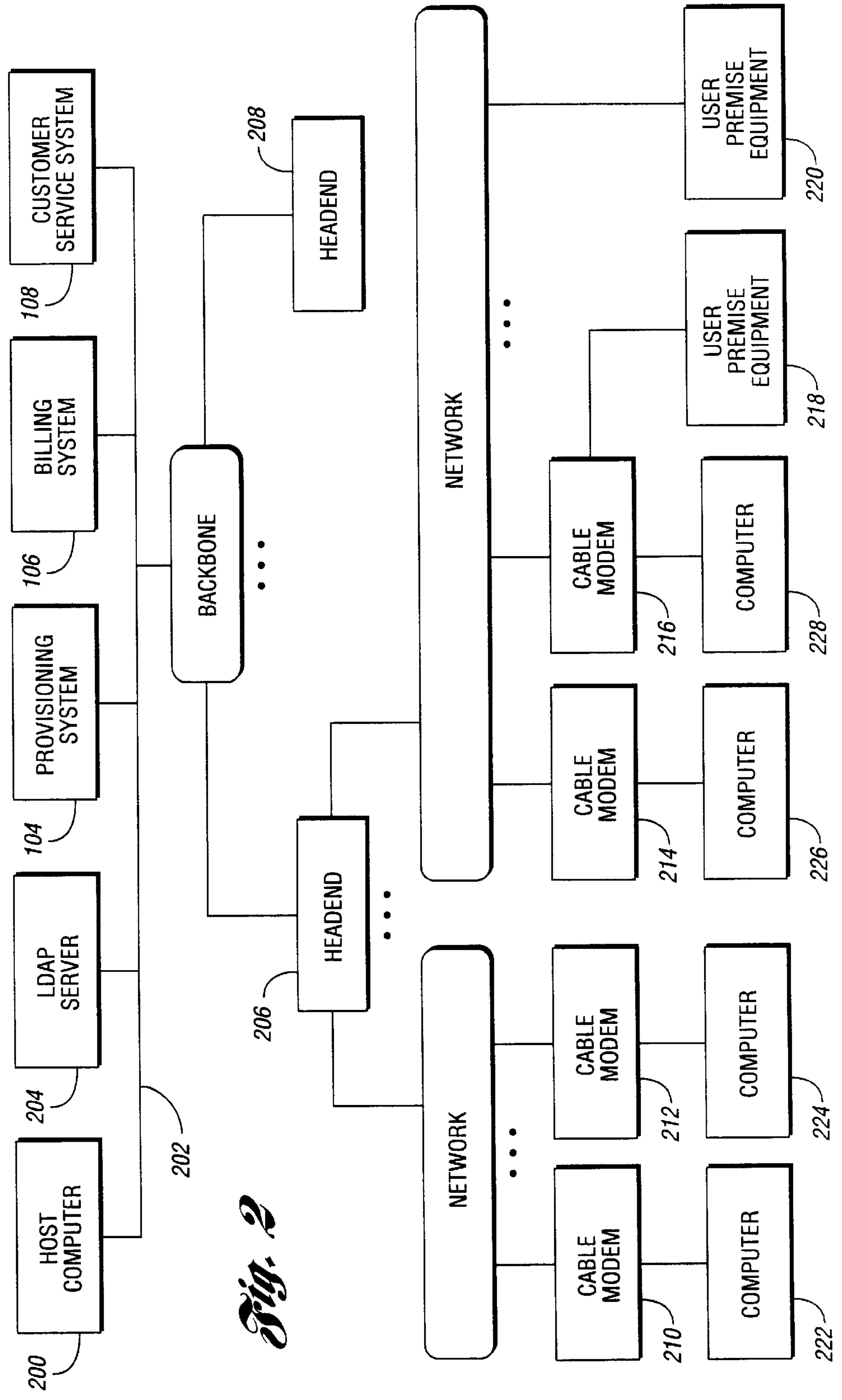
FIG. 2 is a block diagram of the hardware as seen by the software programs from FIG. 1.

FIG. 2 is a layout of the hardware environment used in the present invention. Host computer 200 provides the resources for the customer interface program 112, employee interface program 142, web server program 114, network management protocol programs 138, shell script 118 and all of the API's 120, 122, 126, 136 and 140. Host computer 200 is linked to the provisioning system 104, billing system 106 and customer service system 108 by a backbone network 202. A Lightweight Directory Access Protocol (LDAP)(IAB RFC 2251) server 204 is also connected to the backbone network 202, and provides storage for the customer record database 124. Many other server types not shown, may be found on the backbone network 202, for example, Domain Name System servers, communication servers, fire wall servers, data servers, directory servers, and the like.

Backbone network 202 may be connected to other networks, network segment, and sub-networks. Two example connections are shown in FIG. 2, to headends 206 and 208. Headend 206 ultimately connect, to cable modems 210–216 and user premise equipment 218–220 at the user's location. The cable modems 210–216 provide the user's computers 222–228 with access up to the backbone network 202. Headend 208 connects to other cable modems, computers and user premise equipment (not shown) in another part of the city, or in another city altogether.

Figure 3A:
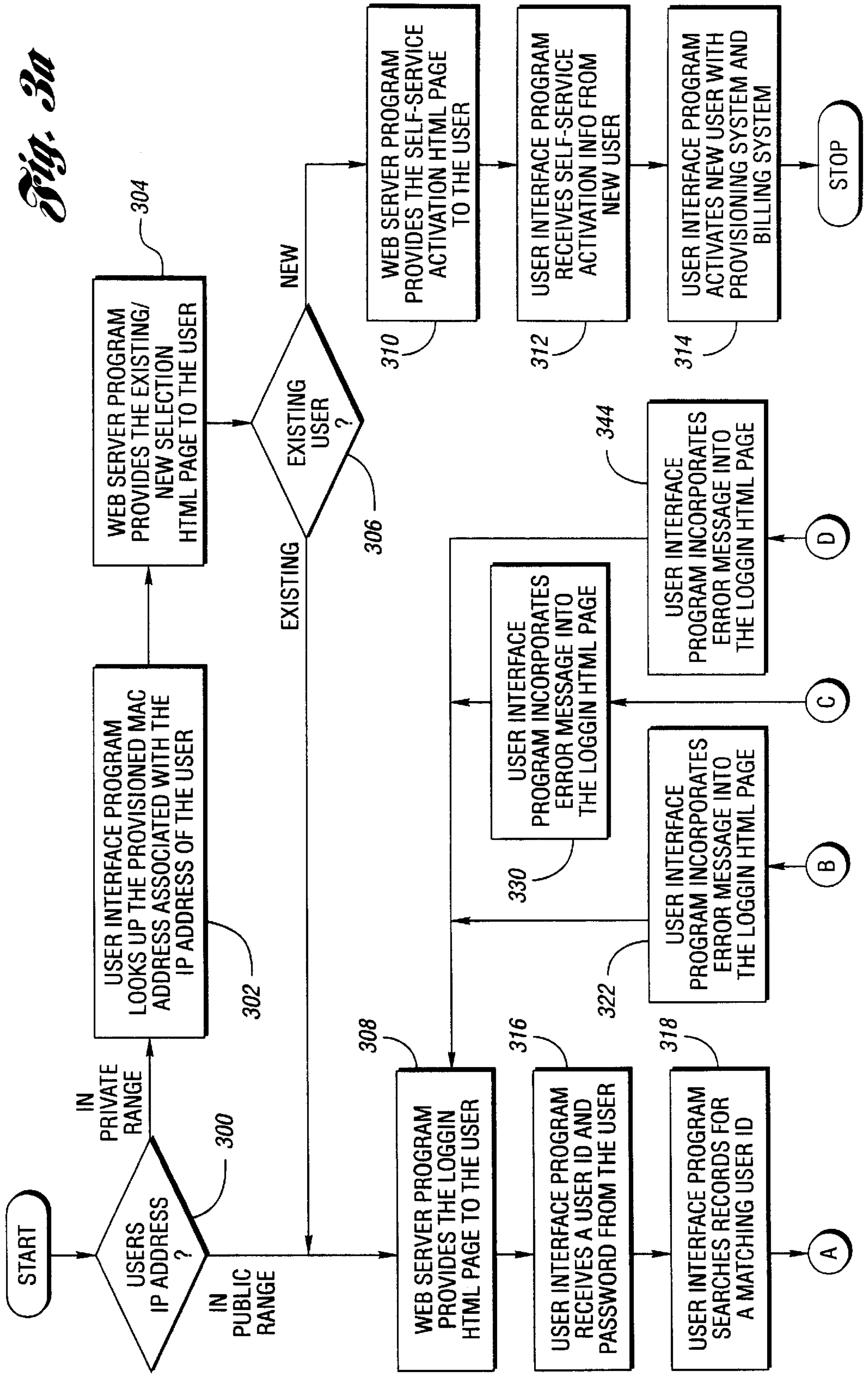
FIG. 3 is a flow diagram of a process implemented by the present invention to login users.
Figure 3B:
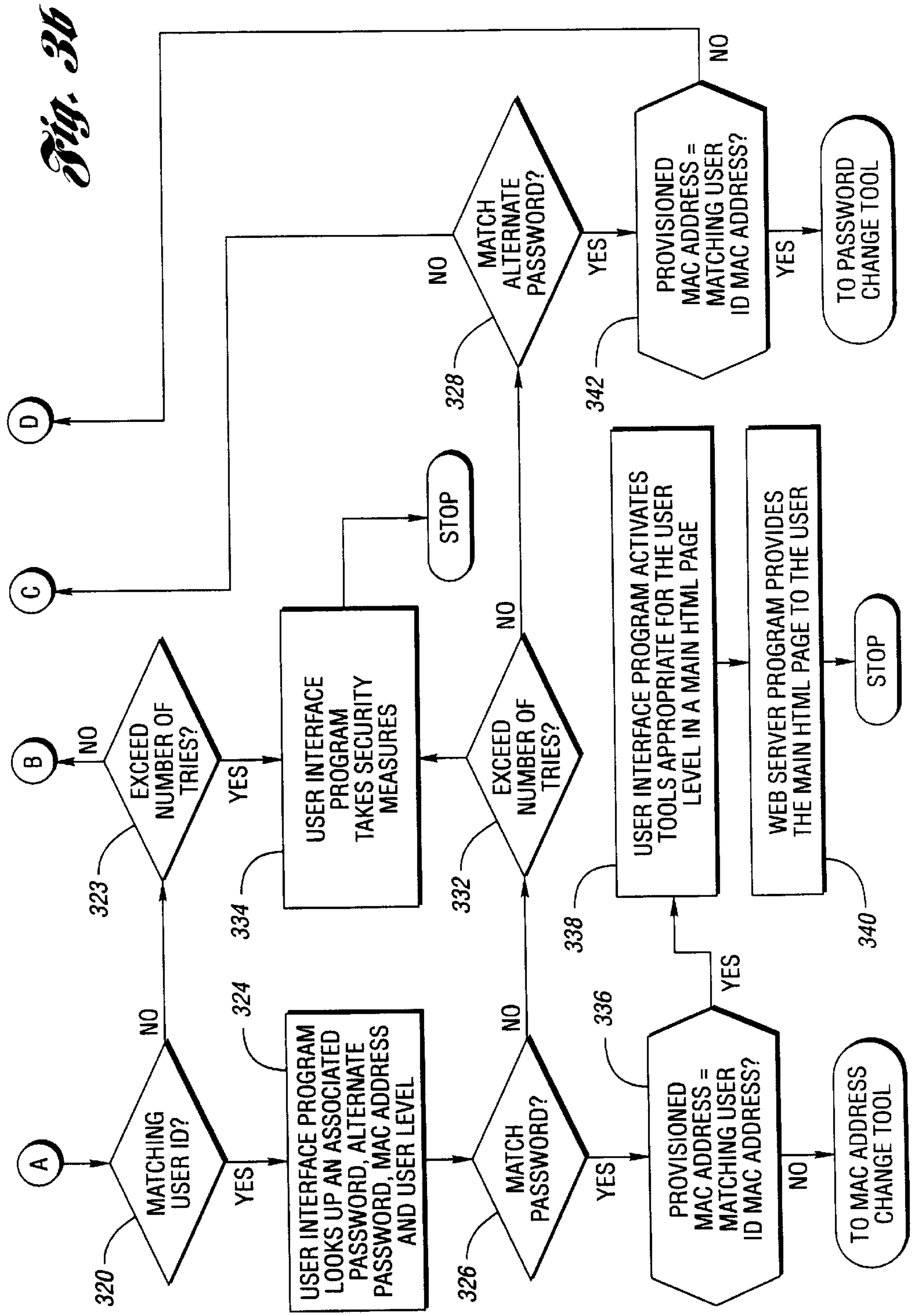

The first task of a user 102 wishing to access through the self service gateway 100 is to login. Login can take on one of three forms, public, private, and new users. In FIG. 3, each login starts by examining the Internet Protocol (IP) address supplied by the user when accessing the self service gateway 100, as shown by decision block 300. If the IP address is in the range of IP addresses allocated to the MSO, then the user 102 is on one of the MSO's private networks. If the IP address of the user 102 is not within the range allocated to the MSO, then user 102 is accessing the self service gateway 100 through a public network not controlled by the MSO. For private network users, the customer interface program 112, or employee interface program 142 (hereafter referred to as a user interface program) obtains the user's medium access control address from the provisioning system, as shown in block 302. This information will be used later in the function. Web server program 114 provides the user 102 with an existing/new user selection HTML page, as shown in block 304. The user's declaration as a new or existing user is acted upon, as shown in decision block 306. Existing private network users and public network users are provided a login HTML page, as shown in block 308. New users are provided with a self-service activation HTML page, as shown in block 310.

New users are requested to enter information about the types of service requested and billing information necessary to establish an account, as shown in block 312. After the information is provided, the user interface program passes the information along to the provisioning system 104 and billing system 106 to register the new user, as shown in block 314.

Existing users 102 logging into the self service gateway 100 must provide a user identification and a password, as shown in block 316. The user interface program then searches the customer record database 124 or the employee record database 144 as appropriate (hereafter referred to as the record database) for a match to the user identification, as shown in block 318. If no match is found, the no branch of decision block 320, then an error message is incorporated into the login HTML, as shown in block 322. Where the user enters an invalid user identification an excessive number of times, decision block 323, the user interface program takes security measures, as shown in block 334. If a matching user identification is found, then a password, an alternate password, and MAC address associated with the user identification are read from the record database, as shown in block 324. Where the entered password does not match either the database password, the no branch of decision block 326, or the alternate password, the no branch of decision block 328, then an error message is returned to the user 102, as shown in block 330. After a predetermined number of incorrect passwords are entered, the yes branch of decision block 332, then the user interface program takes security measures, block 334, to stop any further attempts by this particular user 102 from logging in.

Where the entered password matches the record database password, the yes branch of decision block 326, then the provisioned MAC address (obtained from the provisioning system 104 earlier in block 302) is compared with the MAC address stored in the record database under the user identification, as shown by decision block 336. If the two MAC addresses match, then user 102 has successfully logged in and shown the main HTML page for the self service gateway 100, as shown in blocks 338 and 340. When the two MAC addresses do not match, user interface program executes a MAC address change tool to allow the user 102 to register the new equipment using the provisioned MAC address.

From time to time users 102 forget their passwords. The self service gateway 100 accounts for this by allowing the users 102 to login using an alternate password. Since the alternate password is one that is unlikely to be forgotten, such as a child's name, birthday, or other well known phrase, it is more likely that an unauthorized user 102 will successfully guess the alternate password. To minimize the probability of an unauthorized login, the present invention will only allow an alternate password login from the computer registered with the user identification in the record database. After the entered password matches the record database alternate password, the yes branch of decision block 328, the user interface program checks the provisioned MAC address (determined in block 302 earlier) with the MAC address associated with the user identification stored in the record database, as shown in decision block 342. Where the provisioned MAC address does not match the MAC address stored in the record database, then an error message is provided to the user, as shown in block 344, and the login denied. Where the provisioned MAC address matches the MAC address stored in the record database, the user interface program executes a password change tool to prompt the user 102 to enter a new password.

Accounts for the users 102 are maintained in the billing system 106. In the preferred embodiment of the present invention, three levels of accounts are provided to support commercial, residential and other variations of user groupings. Owner accounts are the highest level accounts. Below the owner accounts are one or more sub-accounts. Below each sub-account is one or more user accounts.

The owner account is the company department, residential customer, or organization that receives the billing statement. Each bill is organized by sub-account allowing a quick view of how each sub-account is organized and what charges the sub-accounts have incurred. Users 102 having a user level that permits access to the owner accounts have the capability to add, delete and modify sub-accounts beneath their respective owner account.

Sub-accounts are associated with a site-administrator in a commercial setting, and the primary user in a residential setting. Sub-account users have the capability to add, delete, and modify individual user accounts beneath their respective sub-account. For example, the sub-account user may set the bandwidth and number of users authorized at their location. In another example, sub-account users can establish e-mail accounts and associated e-mail parameters for the user accounts. Each sub-account should have an independent billing capability. This capability will allow users to acquire extended service capabilities beyond those subscribed for in the owner account. This is important in situations where a small group, or just one user has special requirements. By billing the special requirement separately at the sub-account level the owner account does not incur the cost of paying to provide the special need for all users under the owner account. These extended service represent additional revenue opportunities to the MSO and thus should be associated with an account number that is different than that of the owner account.

One or more user accounts are associated with each sub-account. Each employee in a commercial setting, and each family member in a residential setting has their own user account. User accounts have control over aspects of their accounts such as the MAC address of their computer, e-mail account names, e-mail account passwords, filters, a domain name system (DNS) hostname for their computer, and similar parameters unique to the person and their equipment.

The self service gateway 100 identifies the account level and other permissions and restrictions associated with each user 102 by maintaining a user level record for each user 102 in the record databases. Users 102 at the highest user level have access to all information and all tools. Users 102 at the lowest user level have a view only capability, possibly further limited to as little as only one user account. All tools in the tool database 130 and the web pages in the HTML page layout database 128 are responsive to the user level requiring the user 102 to have a predetermined user level or higher before the information is displayable, or the function can be invoked. For example, a user 102 having access to a sub-account can see information and make changes at the sub-account level and all user accounts below that particular sub-account. This user 102, however, cannot make changes to the owner account of which they are a member.

MSO employees have high user level allowing them access from most to all functions available. This allows the employees to maintain the self service gateway 100, provisioning system 104, and billing system 106, as well as handle special situations that cannot be dealt with directly by the customers through the tools normally available. Usually, the employees have access to, and see more information than the typical customer. A few examples of the additional information are hyperlinks and expanded help documentation on the web pages. Employees can also search and view the logging database 134 for troubleshooting and security purposes.

The self service gateway 100 is responsive to the IP address of the users 102. The IP address indicates whether the user 102 is on a network controlled by the MSO company (a private network) or from a network controlled by some other entity (a public network). An IP address from a private network indicates that the user 102 is an existing customer, a new customer seeking to open an account, or a non-MSO user who has broken into one of the MSO's private networks. Where the provisioning system 104 allocates the IP addresses from different ranges for registered and non-registered equipment, the customer service system 100 can further distinguish what type of user with which it is dealing. An IP address indicating non-registered equipment can be used to limit an existing customer with new equipment to registering the new equipment initially, after which the limitation is removed. New customers and non-MSO users whose equipment is not registered with the provisioning system 104 may be restricted to opening new accounts only.

An IP address from a public network indicates an existing customer or a non-MSO user with Internet access through another provider. New customers and non-MSO users are not allowed to open account via a public network since they are not being serviced by the MSO's provisioning system 104. In theory, only existing customers should be logging into the self service gateway 100 from public networks. To account for the possibility that a non-MSO user does successfully complete an unauthorized login, all users 102 from public networks are denied access to key information and functionality. In particular, a public network user 102 cannot change passwords, login using the alternate password, or view credit card and bank account billing information. Other potentially harmful functions and information may be denied to public network users 102 as deemed necessary.

After the users 102 have successfully logged in, they may initiate changes to the provisioning system 104 and billing system 106. The tools are designed to minimize problems with these changes by validating the change parameters supplied by the users 102. Validation can take on several forms depending upon the type of change being requested. Duplication checks are performed wherever the parameter being changed must be unique in all of the provisioning system 104, billing system 106 or record databases. Examples of parameters that must be unique include MAC addresses of registered equipment, user identifications, and e-mail addresses. Validation may check that the proper linking is made between objects. For example, all user accounts must be linked to an existing sub-account, and each vanity DNS hostname must be linked to an existing piece of registered equipment. Validation also includes range and syntax checking. This includes setting filters with valid values, providing the proper number of digits for the type of MAC address being registered, avoiding restricted DNS hostname domains, and so on.

Figure 4:
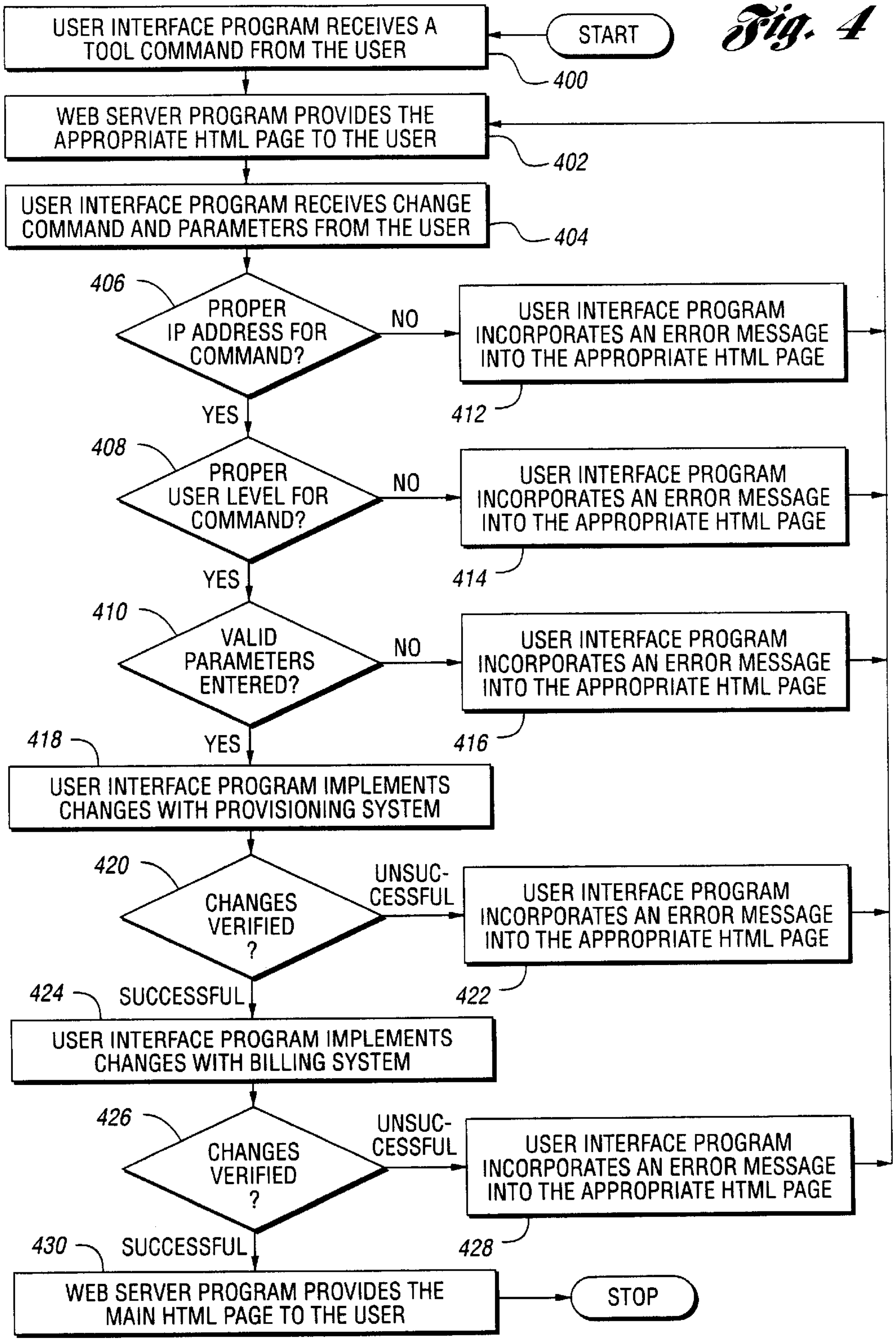
FIG. 4 is a flow diagram of a generic process for making changes to the provisioning system and the billing system.

FIG. 4 is a flow diagram of a generic function that initiates changes to both the provisioning system 104 and billing system 106. The function starts upon receipt of a command for a specific tool from the user 102, as shown in block 400. The web server program 114 then provides the appropriate display to user 102 with information suitable for the user level and IP address, as shown in block 402. Next the user interface program 112 receives a change command and associated parameters from the user 102, as shown in block 404. The requested command is then checked for proper IP address and proper user level, as shown by decision blocks 406 and 408 respectively, and the parameters are validated, as shown by decision block 410. An error message is generated if any problem are encountered, as shown in blocks 412, 414 and 416. When no problems are found with the change command and parameters, the user interface program implements the requested change with the provisioning system 104, as shown in block 418. The change is then verified, as shown in block 420, and an error message generated if verification is unsuccessful, block 422. After the provisioning system 104 has been successfully changed, the associated changes are implemented in the billing system 106, a shown in block 424. Here too, the change is verified, as shown by decision block 426, and any errors reported to the user 102, as shown in block 428. After the change is successfully implemented, the user 102 is returned to the main web page, as shown in block 430.

Variations on the function shown in FIG. 4 will exist from tool to tool within the tool database 130. Some tools may cause changes only in the provisioning system 104. For example, replacing an existing DNS hostname with a new DNS hostname will cause a change to a dynamic DNS server within the provisioning system 104, but does not create any changes to the account billing. Other changes, such as the credit card number an owner account is billed against, invoke only billing system 106 changes. Several specific tools are described in detail below.

A MAC address tool provides the functionality necessary to register and de-register equipment with the provisioning system. Referring to the flow shown in FIG. 4, the user interface program receives a MAC address tool command from the user 102, as shown in block 400. The web server program 114 then displays a MAC address HTML page, as shown in block 402. To register a new MAC address, the user 102 enters the address and the associated user account, which are received by the user interface program in block 404. Checks are then made for the proper IP address and user level of the user 102, as shown by decision blocks 406 and 408. Decision block 410 validates the new MAC address by checking for duplicates, and validates that the user account exists. If validation is successful, the new MAC address is sent to the provisioning system 104 for registration, as shown in block 418. A new dump of the registration file from the provisioning system 104 is then examined to verify that the new MAC address was in fact registered, as shown by decision block 424. The billing system 106 is then notified to add the additional registered MAC address to the entered user account, as shown in block 424. The addition is verified in decision block 426, and if successful, the user 102 is returned to the main HTML page, as shown in block 430.

De-registration of a MAC address is similar to registration. The user interface program receives the desired MAC address to be de-registered in block 404. Checks are made for proper IP address and user level, as shown by decision blocks 406 and 408 respectively. Validation, decision block 410, involves checking that the desired MAC address exists and is currently registered with the provisioning system 104. The provisioning system 104 is then requested to de-register the selected MAC address, as shown in block 418. The de-registration is verified, decision block 420. Billing system 106 is requested to delete the MAC address from the appropriate account, as shown in block 424. The deletion is verified, decision block 426. Finally, the user 102 is returned to the main HTML page, as shown in block 430.

An e-mail tool is provided to allow users 102 to add, delete and modify e-mail accounts. The e-mail tool follows the basic functional flow shown in FIG. 4 to adding/deleting e-mail accounts where e-mail addresses, names, and passwords are added/deleted from the provisioning system 104 and the accounts are charged/not charged accordingly in the billing system 106. When user 102 modifies an existing e-mail account by changing the e-mail name, password, forwarding address, filters, or other parameters of the account, then the change are usually only implemented in the provisioning system. In such cases, after the change to the provisioning system 104 is verified, as shown in block 420, the main HTML page is provided to the user 102, as shown in block 430.

A DNS hostname tool is provided to allow the users 102 to choose Englishlike names that can be used to identify their computers on the Internet. This tool also follows the basic flow as shown in FIG. 4. Validation of the entered vanity DNS hostname, decision block 410, involves checking for duplications, and checking for restricted domains, such as ".com", that are assigned only by the Internet Network Information Center. Vanity DNS hostnames are implemented with one or more DNS servers within the provisioning system 104, as shown in block 418. Billing for this service may or may not be required depending upon the policy of the MSO company.

A service level tool allows the users 102 to control the speed at which they can communicate across the network. Users 102 can select the upstream bandwidth, downstream bandwidth, access priority and burst rate that their equipment is allowed to use on the network. Parameters can be manually entered (in block 404) and validated (in decision block 410), or a list of valid options may be provided in menus within the HTML page provided to the user 102 in block 402.

Figure 5:
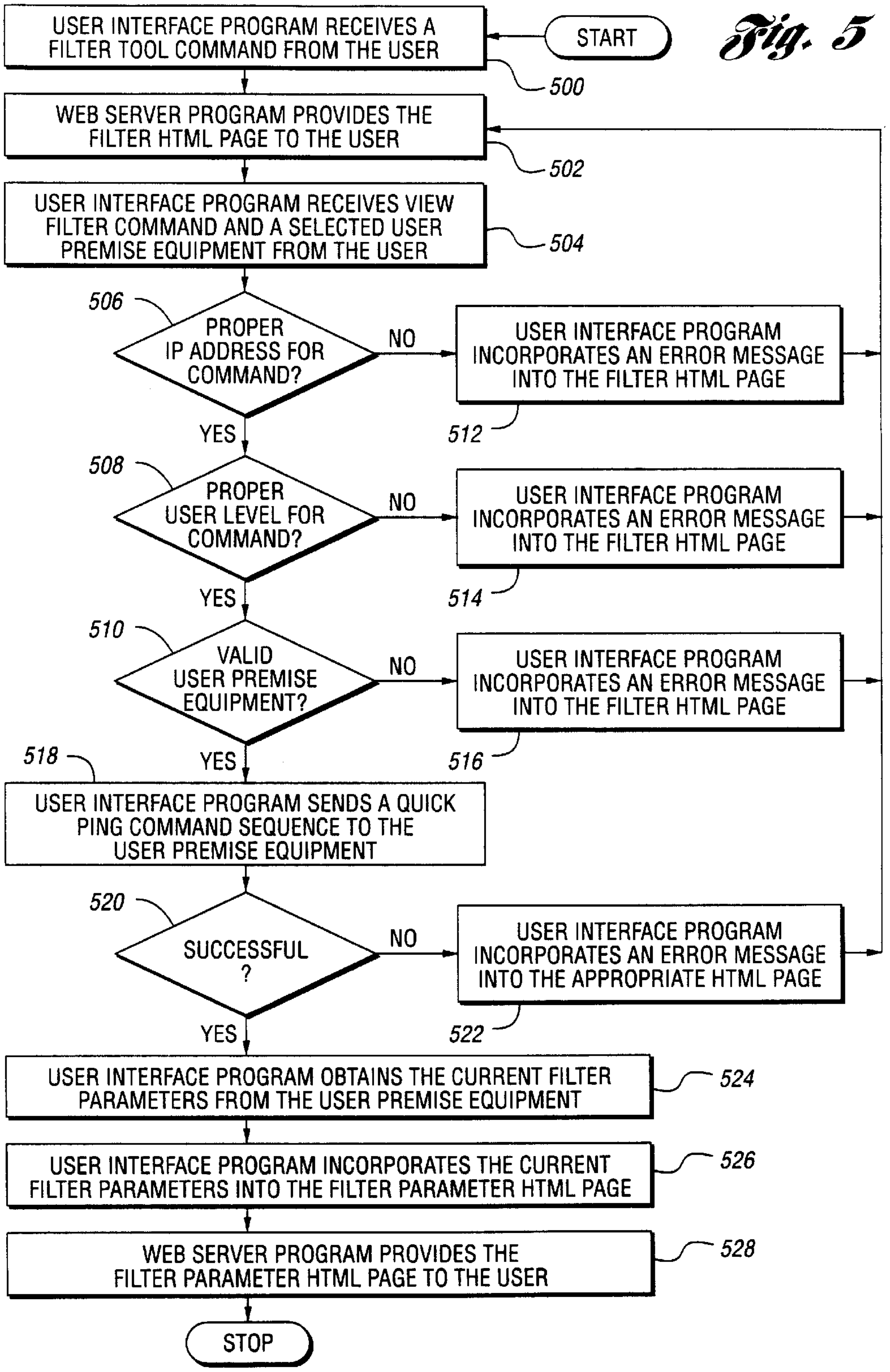
FIG. 5 is a flow diagram of a process for viewing filter parameters in equipment on the network.

Some tools do not affect the provisioning system 104 or billing system 106. An example if a filter tool that is used to activate, deactivate and modify filters within the user premise equipment. FIG. 5 is a flow diagram of the filter tool function used to view the current setting of a user premise equipment filter. The function starts with the receipt of a filter tool command from the user 102, as shown in block 500. Web server program 114 then provides the filter HTML page to the user 102, as shown in block 502. The user's selection of a desired user premise equipment and a command to view the current filter parameters are received by the user interface program in block 504. The command is checked for proper IP address and user level, as shown in blocks 506 and 508 respectively. If the command is proper, then the user interface program validates that the desired user premise equipment exists, as shown in decision block 510. User 102 is notified of any errors encountered during the IP address, user level and validation checks, as shown by blocks 512, 514 and 516 respectively. Next, the user interface program sends a quick ping command sequence to the desired user premise equipment to confirm that it is operational and communicating on the network, as shown in block 518. If the user premise equipment fails to respond to the quick ping command, the no branch of decision block 520, then an error message is provided to the user 102, as shown in block 522. If the user premise equipment successfully responds to the quick ping command, then the user interface program obtains the current filter parameters, block 524, and incorporates them in a filter parameter HTML page, block 526. The web server program 114 provides the filter parameter HTML page to the user 102, as shown in block 528.

From the filter parameter HTML page, user 102 may issue a command to de-activate the filter, activate the filter, and modify some or all of the filter parameters of the user premise equipment. Once the changes are entered, the IP address and user levels are checked, and the new parameters are validated. The user interface program then sends another quick ping command sequence to confirm that the user premise equipment is still operational and communicating on the network. When a response is received from the quick ping command, the modified filter parameters are sent to the user premise equipment for implementation. In the preferred embodiment of the present invention standard filters are available for the user premise equipment as part of account changes. Special filters may be implemented for a fee. Where the user 102 has implemented a special filter then the billing system 106 will also be notified of the event to charge the appropriate account accordingly.

A password change tool provides the functionality necessary to change account passwords. The first portion of the process is identical to that of the generic process described above. The function starts upon receipt of a password command from the user 102, as shown in block 600. Web server program 114 responds by providing a password HTML page, as shown in block 602. In block 604, the user 102 enters the old password and two copies of a new password. Decision block 606 checks that the user 102 has the proper IP address to change this password. This check can be used to prevent an unauthorized user 102 from a public network, who has successfully logged into someone else's account, from changing passwords. The next check, decision block 608, is for proper user level. Then the old password and two copies of the new password are validated, as shown in block 610. In this case, validation requires two steps, one to match the old password with the password associated with the user identification in the record database, and a second to confirm that the first entered copy of the new password and the second entered copy of the new password match each other. Should any of the decision blocks 606, 608 or 610 identify an error, an appropriate message is inserted into the password HTML page in blocks 612, 614 and 616 respectively. After all of the checks have been successfully completed, the user interface program replaces the old password with the new password in the record database, as shown in block 618. Web server program 114 then returns the user 102 to the main HTML page, as shown in block 620. For the case where the user 102 has forgotten the password and has successfully logged in using the alternate password, the user interface program will pre-load the old password into the password HTML page for the user 102, as shown in block 622.

Figure 6:
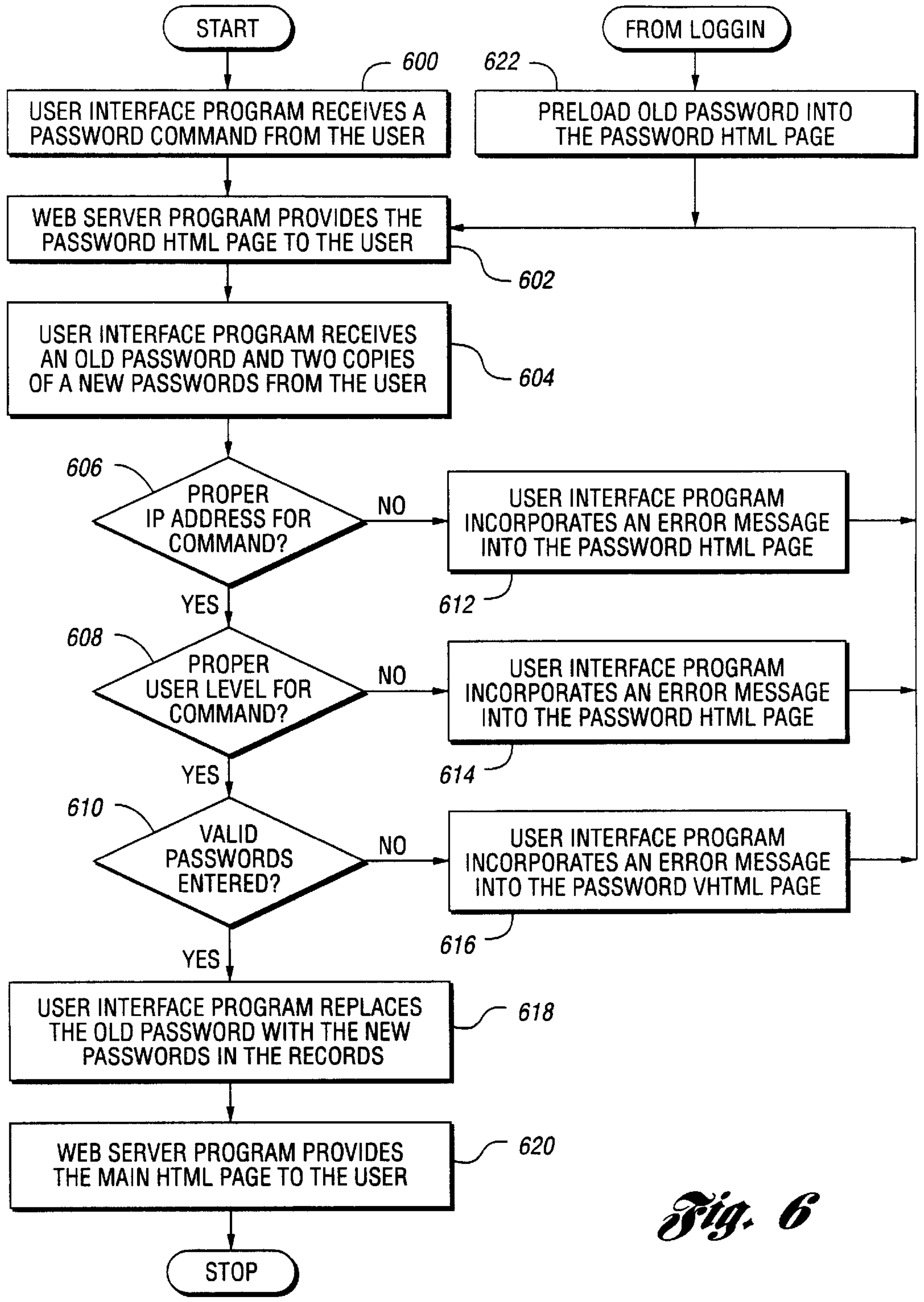
FIG. 6 is a flow diagram of a process that changes the user's password.

The process for changing the alternate password is similar to that shown in FIG. 6 for changing the password, without block 622. When the self service gateway 100 receives a command from the user 102 to change the alternate password, an alternate password HTML page is provided. The user 102 enters the old alternate password and two copies of a new alternate password. Checks are made for proper IP address, user level, and the alternate password entries are validated. If all checks are successful, the old alternate password is replaced with the new alternate password in the record database. In an alternate embodiment, the alternate password HTML page may not include an entry for the old alternate password, and the validation may not include matching the entered old alternate password with the existing old alternate password in the record database. This embodiment allows the user 102 to set a new alternate password when they have forgotten their existing alternate password.

Figure 7:
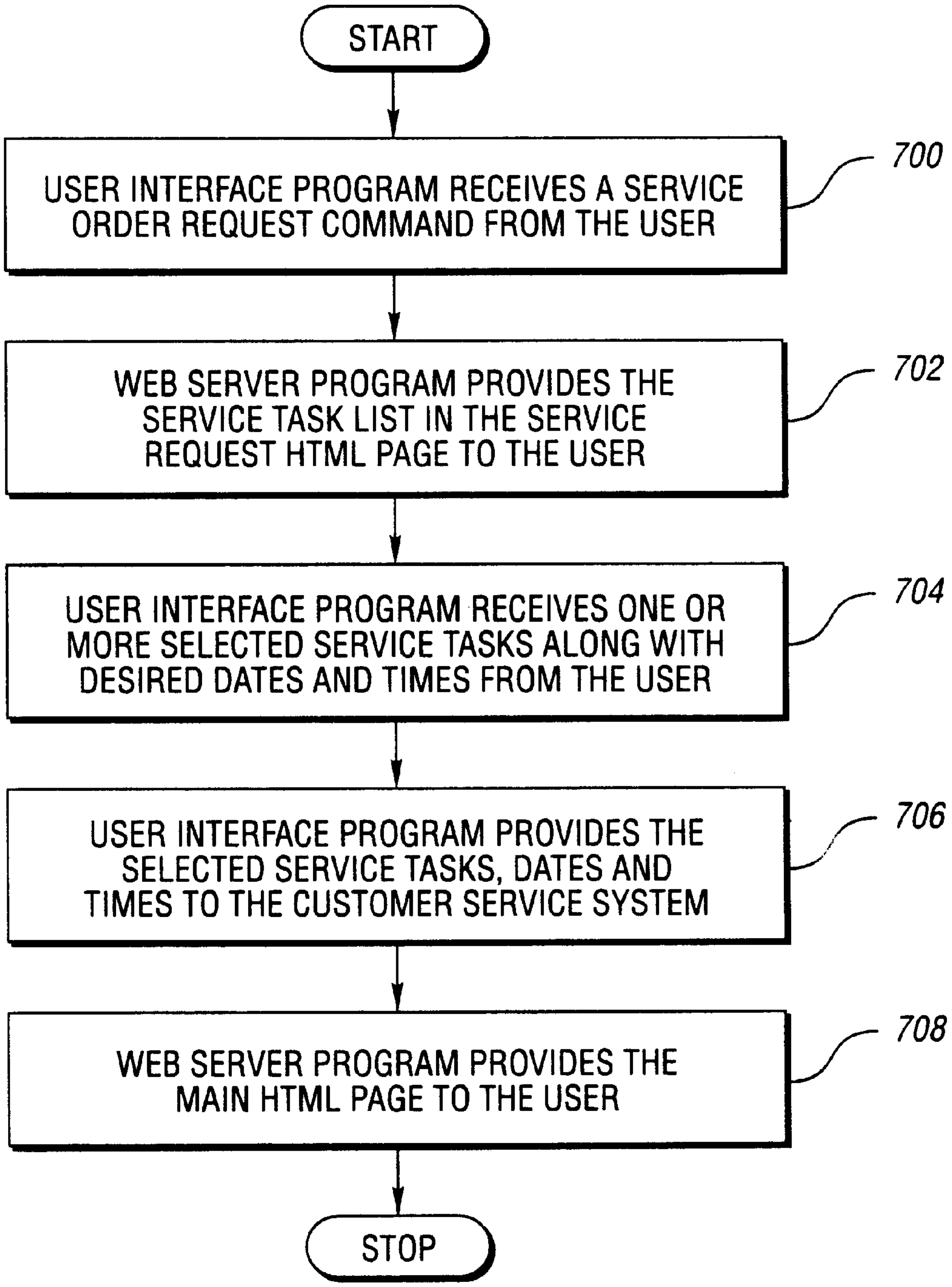
FIG. 7 is a flow diagram of a process for providing a list of supported service order requests to the user, and obtaining the users' selection.

The self service gateway 100 will not eliminate the need for the MSO's customer service system to help the customers. The customer may require repairs on MSO equipment in their home, require routing of new wiring, have questions about their account bill, or other service tasks that require employee involvement. To support these types of tasks, a service order tool provides an interface between the customers and the field service personnel. Referring to FIG. 7, the process starts when the user interface program receives a service order request command from the user 102, as shown in block 700. Web server program 114 then provides a list of supported service tasks in a service request HTML page back to the user 102, as shown in block 702. User 102 returns one or more selections from the list along with desired dates and time, block 704. User interface program relays the selected service tasks and the requested dates and time to the customer service system 108, as shown in block 706. User 102 then returns to the main HTML page in block 708.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A self service gateway system that allows a user on a network to interact with a provisioning system and a billing system for the network, the self service gateway system comprising:

at least one user interface program in communication with the billing system, the provisioning system, and the user;

a server program interposed between the user and the at least one user interface program and operative to provide a set of protocols that facilitate communications between the user and the at least one user interface program;

a page layout database having a plurality of display pages, the page layout database being in communication with the at least one user interface program for displaying information to the user;

at least one directory database having a plurality of records associated with the user, and in communication with the at least one user interface program; and a tool database having a plurality of tools, wherein the plurality of records of the at least one directory database includes a plurality of user levels accessible to the plurality of tools, the tool database being in communication with the at least one user interface program, the plurality of tools being operative to instruct the at least one user interface program how to change at least one account in the billing system, at least one service parameter in the provisioning system, and at least one record of the plurality of records as necessary in response to a plurality of inputs from the user, wherein to change includes to add, to delete, to modify, and to replace, wherein at least one tool of the plurality of tools is responsive to the plurality of user access levels to restrict changes initiated by the plurality of inputs from the user.

2. The self service gateway system of claim 1 wherein the at least one user interface program includes a customer interface program and an employee interface program, the at least one directory database includes a customer directory database and an employee database, and the customer directory database and the employee database are in communication with the customer interface program and the employee interface program respectively.

3. The self service gateway system of claim 1 wherein the network further includes at least one user premise equipment, the system further comprising at least one network management protocol program operative to provide communications between the at least one user interface program and the at least one user premise equipment.

4. The self service gateway system of claim 3 wherein the plurality of tools in the tool database are further operative to instruct the at least one user interface program how to activate, deactivate, and modify at least one filter in the at least one user premise equipment.

5. The self service gateway system of claim 3 further comprising at least one application program interface program disposed between the at least one user interface program and the at least one network management protocol program and operative to facilitate communications between the at least one user interface program and the at least one network management protocol program.

6. The self service gateway system of claim 1 further comprising an application program interface program between the at least one user interface program and the provisioning system and operative to facilitate communications between the at least one user interface program and the provisioning system.

7. The self service gateway system of claim 1 further comprising an application program interface program disposed between the at least one user interface program and the billing system and operative to facilitate communications between the at least one user interface program and the billing system.

8. The self service gateway system of claim 1 further comprising an application program interface program disposed between the at least one user interface program and the at least one directory database and operative to facilitate communications between the at least one user interface program and the at least one directory database.

9. The self service gateway system of claim 1 further comprising at least one shell script program disposed between the at least one user interface program and the server program to facilitate communications between the at least one user interface program and the server program.

10. The self service gateway system of claim 1 further comprising a logging database in communication with the at least one user interface program and operative to record information provided by the at least one user interface program.

11. The self service gateway system of claim 10 further comprising an application program interface program disposed between the at least one user interface program and the logging database and operative to facilitate communications between the at least one user interface program and the logging database.

12. The self service gateway system of claim 1 further comprising a build tool program operative to add, delete, modify, and replace the plurality of tools in the tool database and the plurality of display pages in the page layout database.

13. The self service gateway system of claim 1 further comprising a browser program associated with each user and operative to provide the set of protocols that facilitate communications between the user and the at least one user interface program.

14. The self service gateway system of claim 13 wherein the server program and the browser programs communicate through a secure socket.

15. The self service gateway system of claim 1 wherein the plurality of records includes a plurality of user identifications and a plurality of passwords, and wherein at least one tool of the plurality of tools is further operative to instruct the at least one user interface program how to authenticate a user identification input and a password input from the user against the plurality of user identifications and the plurality of passwords respectively.

16. The self service gateway system of claim 15 wherein at least one tool of the plurality of tools is responsive to an Internet Protocol address of the user received from the user to restrict changes initiated by the plurality of inputs from the user.

17. The self service gateway system of claim 15 wherein at least one tool of the plurality of tools is further operative to instruct the at least one user interface program how to replace a first password of the plurality of passwords with a new password input from the user.

18. The self service gateway system of claim 1 wherein at least one tool of the plurality of tools is operative to instruct the at least one user interface program how to validate additions, deletions, modifications and replacements made to the provisioning system, the billing system, and the plurality of records.

19. The self service gateway system of claim 1 wherein at least one tool of the plurality of tools is operative to instruct the at least one user interface program how to provide viewable information to the user from the provisioning system, the billing system, and the plurality of records.

20. The self service gateway system of claim 1 wherein at least one tool of the plurality of tools is operative to instruct the at least one user interface program how to register and de-register with the provisioning system a selected medium access control address input from the user.

21. The self service gateway system of claim 1 wherein the plurality of records includes a plurality of alternate passwords, wherein the at least one user interface program receives a user identification input, a password input and an Internet Protocol address from the user, wherein at least one tool of the plurality of tools is operative to instruct the at least one user interface program how to determine a provisioned medium access control address based upon the Internet Protocol address, and authenticate the user identification input, the password input, and the provisioned medium access control address against the plurality of user identifications, the plurality of alternative passwords, and the plurality of medium access control addresses respectively.

22. The self service gateway system of claim 21, wherein at least one tool of the plurality of tools is operative to instruct the at least one user interface program how to replace a selected alternate password of the plurality of alternate passwords with a new alternate password input from the user.

23. The self service gateway system of claim 1 wherein at least one tool of the plurality of tools is operative to instruct the at least one user interface program how to add, delete, and modify a plurality of e-mail accounts and at least one associated e-mail account parameter in the provisioning system.

24. The self service gateway system of claim 1 wherein at least one tool of the plurality of tools is operative to instruct the at least one user interface program how to replace a selected domain name system hostname with a new domain name system hostname in the provisioning system.

25. The self service gateway system of claim 1 wherein at least one tool of the plurality of tools is operative to instruct the at least one user interface program how to modify at least one service level parameter in the provisioning system.

26. The self service gateway system of claim 1 wherein the at least one user interface program is in communication with a customer service system, and at least one tool of the plurality of tools is operative to instruct the at least one user interface program how to provide a list of service tasks to the user, receive at least one selected service task input from the list of service tasks as chosen by the user, and provide the at least one selected service task input to the customer service system.

27. The self service gateway system of claim 1 wherein at least one tool of the plurality of tools is operative to instruct the at least one user interface program how to change at least one billing parameter in the billing system associated with the at least one service parameter changed in the provisioning system.

28. A method to allow a user on a network to interact with a provisioning system and a billing system for the network, the method comprising:

providing a plurality of records that store a plurality of user identifications, a plurality of passwords, and a plurality of user access levels;

receiving an Internet Protocol address of the user along with a user identification input and a password input from the user;

comparing the user identification input to the plurality of user identifications to find a matching user identification of the plurality of user identifications, in response to receiving the user identification input;

comparing the password input to a first password of the plurality of passwords associated with the matching user identification in response to finding the matching user identification;

determining a first user access level of the plurality of user access levels associated with the first user identification after matching the password input to the first password associated with the first user identification;

receiving a plurality of inputs from the user after matching the password input to the first password;

changing at least one account in the billing system, at least one service parameter in the provisioning system, and at least one record of the plurality of records in accordance with the plurality of inputs received from the user, wherein changing includes adding, deleting, modifying, and replacing, wherein changing includes restricting changes initiated by the plurality of inputs received from the user based upon the first user access level; and restricting changes initiated by the plurality of inputs received from the user based upon the Internet Protocol address of the user.

29. The method of claim 28 wherein the network includes at least one user premise equipment having at least one filter, the method further comprising:

activating a selected filter of the at least one filter in a selected user premise equipment of the at least one user premise equipment in response to receiving from the user an activate filter command, a filter identification input for the selected filter, and a user premise equipment identification input for the selected user equipment;

deactivating the selected filter of the at least one filter in the selected user premise equipment of the at least one user premise equipment in response to receiving from the user a deactivate filter command, the filter identification input for the selected filter, and the user premise equipment identification input for the selected user identification equipment; and modifying the selected filter of the at least one filter in the selected user premise equipment of the at least one user premise equipment in response to receiving from the user a modify filter command, the filter identification input for the selected filter, the user premise equipment identification input for the selected user identification equipment, and at least one modified filter parameter input.

30. The method of claim 28 further comprising logging completed changes to the at least one account in the billing system, changes to the at least one service parameter in the provisioning system, and changes to the at least one record of the plurality of records.

31. The method of claim 28 further comprising replacing the first password of the plurality of passwords with a new password in response to receiving the first password input and the new password input from the user.

32. The method of claim 28 further comprising validating additions, deletions, modifications and replacements made to the provisioning system, the billing system, and the plurality of records in response to the plurality of inputs received from the user.

33. The method of claim 28 further comprising providing viewable information to the user from the provisioning system, the billing system and the plurality of records in response to the plurality inputs received from the user.

34. The method of claim 28 wherein the plurality of records stores a plurality of medium access control addresses, the method further comprising:

requesting the provisioning system to de-register a selected medium access control address in response to receiving the selected medium access control address input and a de-register command from the user;

removing the selected medium access control address from the plurality of medium access control addresses stored in the plurality of records in response to receiving the selected medium access control address input and a de-register command from the user;

requesting the provisioning system to register the selected medium access control address in response to receiving the selected medium access control address input and a register command from the user; and adding the selected medium access control address to the plurality of medium access control addresses stored in the plurality of records in response to receiving the selected medium access control address input and the register command from the user.

35. The method of claim 28 wherein the plurality of records store a plurality of alternate passwords and a plurality of medium access control addresses, the method further comprising:

receiving an Internet Protocol address of the user along with the user identification input and the password input;

determining a provisioned medium access control address based upon the Internet Protocol address of the user in response to receiving the Internet Protocol address of the user;

comparing the password input with the plurality of alternate passwords in response to not matching the password input with the first password associated with the matching user identification; and comparing the provisioned medium access control address with a first medium access control address of the plurality of medium access control addresses associated with the matching user identification in response to matching the password input to the first password associated with the matching user identification, wherein receiving the plurality of inputs from the user is allowed in response to matching the provisioned medium access control address with the first medium access control address associated with the matching user identification.

36. The method of claim 28 wherein the plurality of records store a plurality of alternate passwords, the method further comprising replacing a selected alternate password of the plurality of passwords with the new alternate password input in response to receiving the new alternate password input from the user.

37. The method of claim 28 further comprising:

requesting the provisioning system add a new e-mail account in response to receiving an add e-mail account command and the new e-mail account input from the user;

requesting the provisioning system delete a selected e-mail account in response to receiving a delete e-mail account command and the selected e-mail account input from the user; and requesting the provisioning system modify the selected e-mail account in response to receiving a modify e-mail account command, the selected e-mail account input, and at least one new e-mail account parameter input from the user.

38. The method of claim 28 further comprising requesting the provisioning system replace the selected domain name system hostname with a new domain name system hostname in response to receiving the selected domain name system hostname input and the new domain name system hostname input from the user.

39. The method of claim 28 further comprising requesting the provisioning system modify at least one service level parameter in response to receiving the at least one service level parameter input from the user.

40. The method of claim 28 further comprising:

providing a list of service tasks to the user;

receiving at least one selected service task input form the list of service tasks as chosen by the user; and providing the at least one selected service task input to a customer service system.

41. The method of claim 28 further comprising requesting the billing system to change at least one billing parameter associated with the at least one service parameter in response to changing the at least one service parameter in the provisioning system.

* * * * *